Patented Jan. 4, 1927.

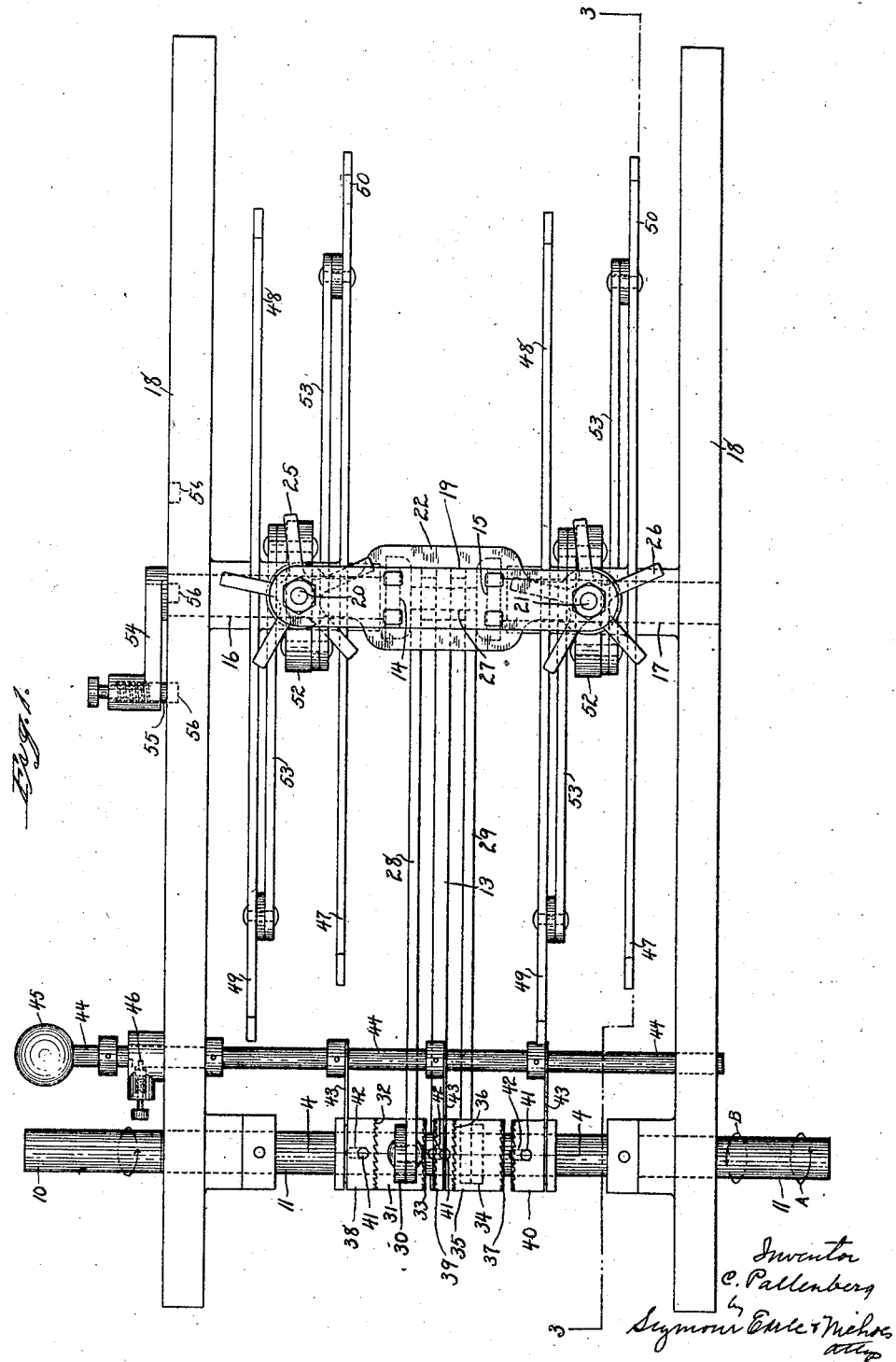

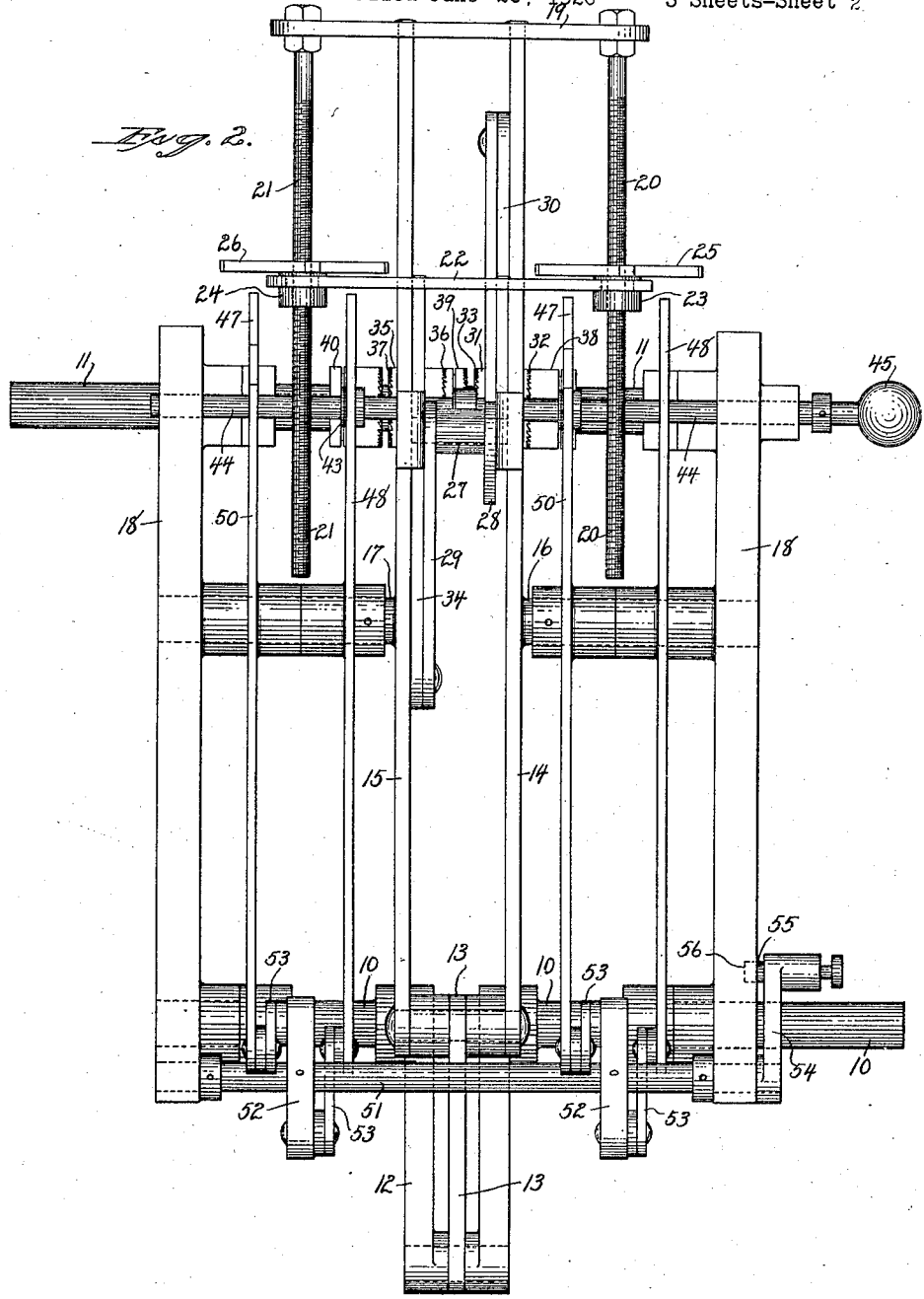

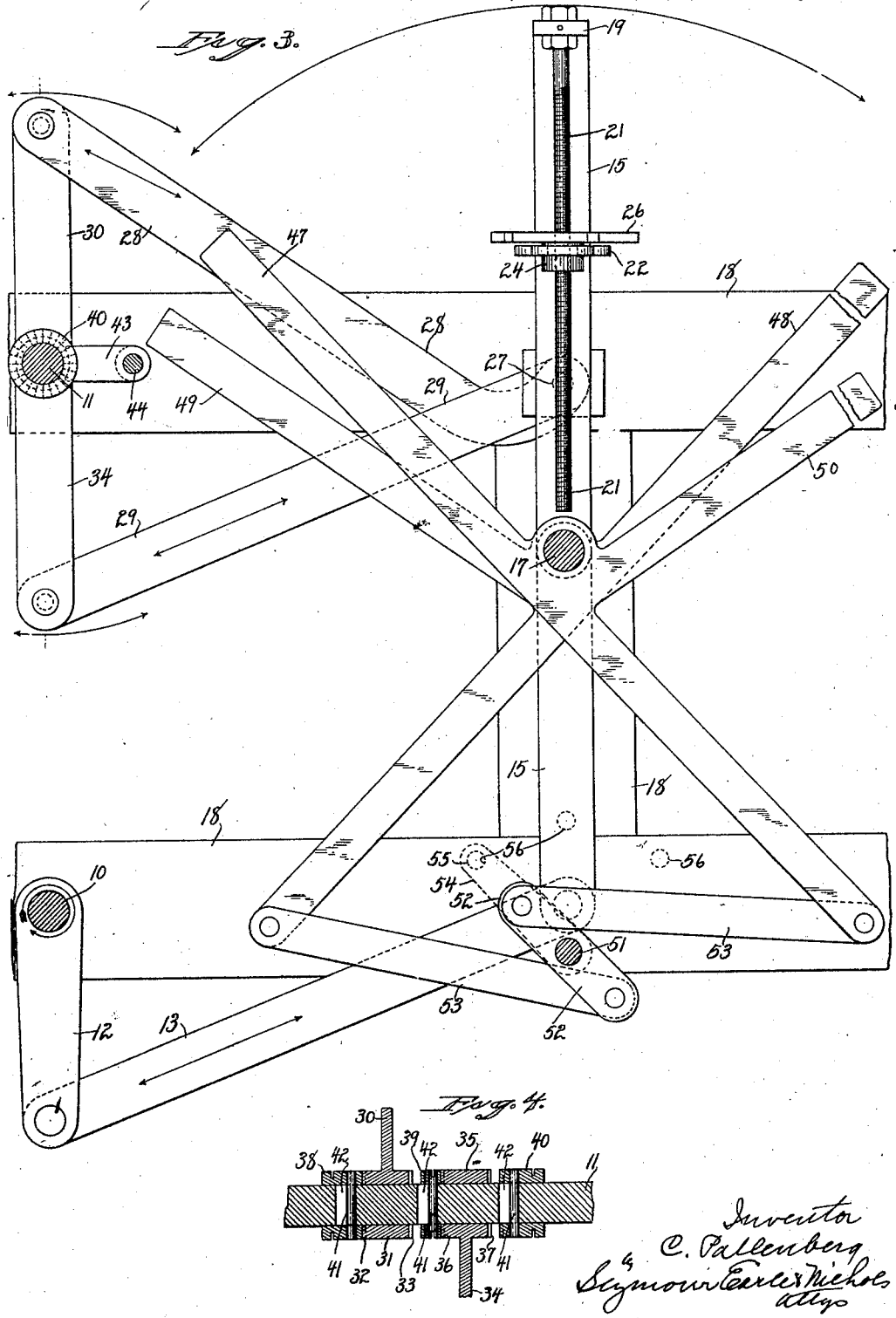

1,613,191

UNITED STATES PATENT OFFICE.

CHRISTIAN PALLENBERG, OF CLINTON, CONNECTICUT.

POWER-TRANSMISSION MECHANISM.

Application filed June 26, 1926. Serial No. 118,735.

Fig. 1 is a top or plan view of a power transmission constructed in accordance with my invention;

Fig. 2 is a view thereof in end elevation;

Fig. 3 is a sectional view on the line 3—3 of Fig. 1; and

Fig. 4 is a sectional view on the line 4—4 of Fig. 1.

This invention relates to improvement in power transmission mechanism, wherein power from a driving-member is transmitted to a driven-member, with particular reference to providing means for varying the relative speed between the two members, and a further object of the invention is to provide for automatically varying the relative speed between the two members. The invention further consists in details of construction and arrangement of parts as will be hereinafter described and particularly recited in the claims.

In carrying out my invention, I employ a drive crank-shaft 10 and a driven-shaft 11. Connected with the crank 12 of the crank-shaft 10 is a connecting-rod 13, which extends into connection with one end of an oscillating frame similar to a walking-beam comprising parallel bars 14 and 15 having outwardly-extending trunnion-shafts 16 and 17, by which it is suitably supported in frame-work 18. At the other end of the oscillating frame is a tie-bar 19, and fixed in this tie-bar and extending downward therefrom are threaded rods 20 and 21. Moving on and guided by the side-bars 14 and 15 is a cross-head 22, and mounted in the opposite ends of the cross-head are nuts 23 and 24, through which the rods 20 and 21 extend, and coupled with these nuts are star wheels 25 and 26, by which the nuts are turned to move the cross-head toward or away from the axis of oscillation of the oscillating frame. Suspended from the cross-head, between the side-bars, is a transverse wrist-pin 27, on which is mounted two links 28 and 29, the link 28 extending into connection with a ratchet-arm 30 extending outward from a ratchet-sleeve 31 having a set of ratchet-teeth 32 at one end and a set of ratchet-teeth 33 at the other end, these sets being reversely turned. The lever 29 extends into engagement with a ratchet-arm 34 carrying a similar ratchet-sleeve 35 provided at its ends with ratchet-teeth 36 and 37, duplicating the teeth 32 and 33, both of these sleeves being free to oscillate on the driven-shaft 11. Mounted on the shaft 11 are sliding ratchet-members 38, 39 and 40, these members being coupled with the shaft by pins 41 extending through axial slots 42 in the shaft, so that the members turn with the shaft but are permitted axial movement thereon, so that they can be moved into and out of engagement with the ends of the ratchet-sleeves, with which they are normally held in engagement by spring-arms 43 mounted on a control-shaft 44 supported in the frame 18 and adapted to be moved by a handle 45 and locked by a spring-latch 46 in any of its positions, so that, when moved in one direction, the driven shaft will be moved in one direction, and when the control-shaft is shifted, the driven-shaft will be moved in the opposite direction. The movement of the driving-shaft thus transmits its movement to the driven shaft, which will turn in one direction or the other, accordingly as the ratchet sleeves are engaged on one side or the other by the movable ratchet members. It will be understood that space is provided to allow the ratchet members to snap out of engagement with the ratchet sleeves.

With the ratchet-sleeves and ratchets engaged as shown in Fig. 1 of the drawings, the driven-shaft 11 will be caused to rotate in the direction of the arrow A. Each complete oscillation of the frame imparts two impulses to the driven-shaft. If, however, the control-rod 44 is shifted so as to cause the ratchet-members 38, 39 and 40 to be correspondingly shifted on the shaft 11, the driven-shaft 11 will be turned in the direction indicated by the arrow B, in whichever direction the springs permit the members and sleeves to ratchet, space being also provided to allow for a neutral position, in which no movement is imparted to the driven-shaft.

The ratio of movement between the drive-shaft and the driven-shaft will depend upon the location of the wrist-pin 27 with reference to the trunnions 16 and 17, and this pin may be moved in any desired manner. As herein shown, each star-wheel 25 and 26 is adapted to engage with oppositely-located shifting-arms 47 and 48, as they oscillate with the frame-members 14 and 15,—that is, the points of the star-wheel engaging with these levers turn the nuts 23 and 24 to move the cross-head outward, and hence moves the wrist-pin 27 with it, thereby increasing the throw of the arms 30 and 34, whereby the driven-shaft is moved faster.

Each star-wheel is adapted to be engaged by another pair of shifting-arms 49 and 50, these being adapted to turn the nuts in the opposite direction, so that the cross-head will be moved toward the axis of oscillation of the frame-bars 14 and 15, and so shorten the length of throw imparted to the arms 30 and 34, thus reducing the relative movement of the driven-shaft to the driving-shaft. Whichever set of arms it is desired to have engage the star-wheel is controlled by a rock-shaft 51 carrying double-ended levers 52, the ends respectively connected by links 53 to the shifting-arms. The rock-shaft 51 is locked in its adjusted position by providing its outer end with an arm 54 carrying a spring-pin 55 entering sockets 56 in the frame 18.

It is obvious that when the wrist-pin 27 is moved into line with the trunnion-shafts 16 and 17, no movement whatever will be imparted to the driven-shaft and from this neutral movement the speed is gradually increased as the pin 27 is moved away from the axis of the oscillating frame.

With these ratchet members in the neutral position, the engine running will operate those star-wheels so as to change the position of the wrist-pin while the driven-shaft remains idle, so that, preparatory to throwing the ratchets into engagement, the position of the wrist-pin 27 may be adjusted to the desired extent.

It is obvious, without further illustration or description, that the ratchet type of clutch shown might be replaced by any of the well-known forms of ratcheting clutches. It is also obvious that the number of ratchets and driving connections may be increased.

I claim:

1. A power transmission, comprising a driving crank-shaft and a driven-shaft, an oscillating frame between the two shafts, connection between the crank-shaft and one end of the oscillating frame, an operating arm mounted on the driven-shaft, a wrist-pin adjustably mounted in the said frame, a connection between said wrist-pin and operating-arm, and means including a threaded rod, a nut through which said rod extends, a star-wheel fixed to said nut, and means for turning the star-wheel for adjusting the position of the said wrist-pin.

2. A power transmission, comprising a driving crank-shaft and a driven-shaft, an oscillating frame between the two shafts, connection between the crank-shaft and one end of the oscillating frame, two reversely-positioned operating arms connected with sleeves on the driven-shaft, means for coupling said sleeves with said driven-shaft, a wrist-pin adjustably mounted in said frame, connections between said wrist-pin and said operating-arms, and means including two threaded rods, nuts through which said rods extend, star-wheels affixed to said nuts for adjusting the position of the said wrist-pin.

3. A power transmission, comprising a driving crank-shaft and a driven-shaft, an oscillating frame between the two shafts, connection between the crank-shaft and one end of the oscillating frame, two reversely-positioned operating-arms connected with sleeves on the driven-shaft, said sleeves having reversely-arranged ratchet-teeth at their ends, means for coupling said sleeves with said driven-shaft, a cross-bar movable on said frame, nuts carried by said cross-bar, star-wheels connected with said nuts, threaded rods carried by said frame and passing through said nuts, a wrist-pin supported by said cross-bar, connections between said wrist-pin and said operating-arms, and means for turning said star-wheels, whereby the position of the wrist-pin may be adjusted.

4. A power transmission, comprising a driving crank-shaft and a driven-shaft, an oscillating frame between the two shafts, connection between the crank-shaft and one end of the oscillating frame, two reversely-positioned operating-arms connected with sleeves on the driven-shaft, said sleeves having reversely-arranged ratchet-teeth at their ends, means for coupling said sleeves with said driven-shaft, a cross-bar movable on said frame, nuts carried by said cross-bar, star-wheels connected with said nuts, threaded rods carried by said frame and passing through said nuts, a rock-shaft, arms carried thereby and adapted to be moved into the path of said star-wheels, whereby said star wheels are turned in one direction or the other, a wrist-pin supported by said cross-bar, and connections between said wrist-pin and said operating-arms.

In testimony whereof, I have signed this specification.

CHRISTIAN PALLENBERG.